A. C. Teel.

Farm Gate.

No. 2,667.

Reissued Jul. 2. 1867.

WITNESSES

J. W. Connly

Geo. W. Reed

INVENTOR

A. C. Teel per Munn & Co attorneys

UNITED STATES PATENT OFFICE.

A. C. TEEL, OF GIRARD, ILLINOIS.

IMPROVEMENT IN FARM-GATES.

Specification forming part of Letters Patent No. 40,777, dated December 1, 1863; reissue No. 2,667, dated July 2, 1867.

*To all whom it may concern:*

Be it known that I, A. C. TEEL, of Girard, in the county of Macoupin and State of Illinois, have invented a new and useful Improvement in Hanging Gates; and I do hereby declare that the following is a full, clear, and exact description thereof, reference being had to the accompanying drawings making a part of this specification, in which—

Figure 1:
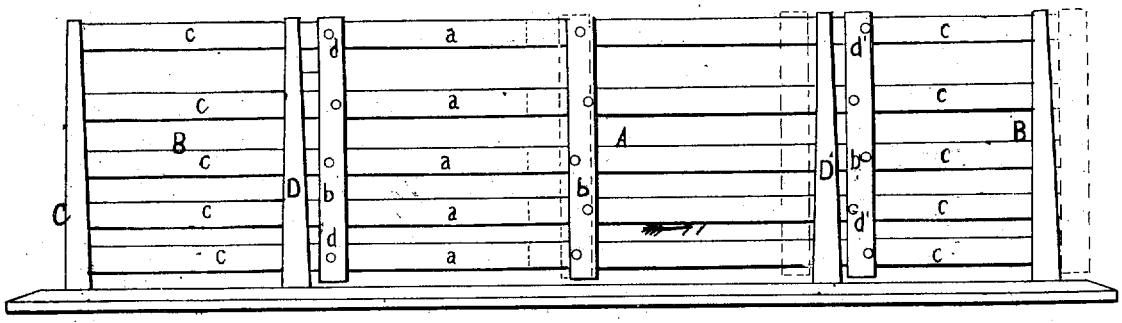
Figure 2:
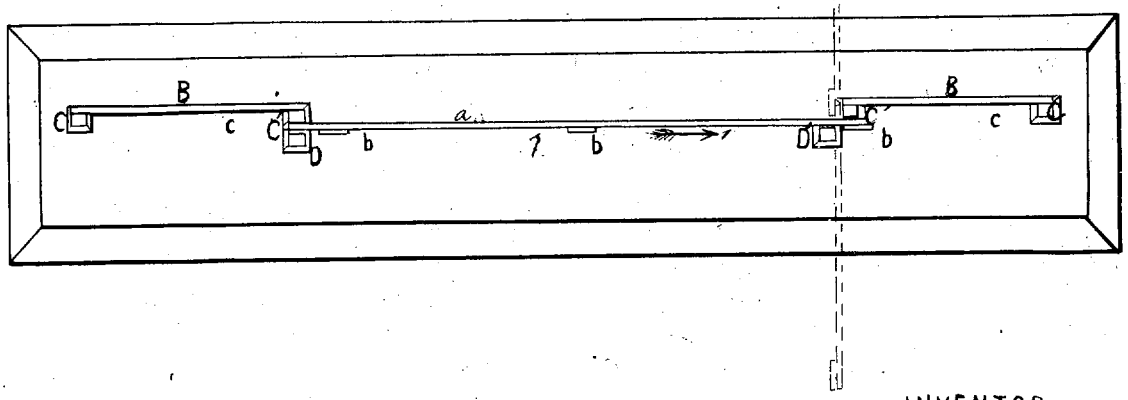

Figure 1 is a side view of my invention; Fig. 2, a plan or top view of the same.

Similar letters of reference indicate corresponding parts in the two figures.

This invention consists in a novel way of hanging gates, whereby the use of hinges is dispensed with, and the gate at the same time rendered capable of being opened and closed with equally as great facility as if it were hung upon hinges, the expense of the latter being therefore avoided without any disadvantage whatever.

To enable those skilled in the art to fully understand and construct my invention, I will proceed to describe it.

A represents the gate, which may be constructed of horizontal slats *a*, nailed or otherwise secured to vertical battens *b*. B B represent the ends of the fence, the space between which is closed by the gate when the latter is shut. This fence may be constructed of horizontal slats *c*, nailed to posts C C′, and by the side of each outer post, C′, of the ends B B of the fence, there are placed posts D D′, as shown clearly in Fig. 2, the post D′ being placed rather beyond the line of the post C′, to which it is near, so as to admit of the slats *a* of the gate fitting between them at right angles to the ends B B of the fence, as shown in red in Fig. 2. The other post D is in line with its post C, as is also shown in Fig. 2. Between the posts D′ and C′ there are two strips, *d*′, on which the upper slat *a* of the gate rests, and similar strips *d* are attached to the posts C′ D at the opposite end of the gate. The strips *d*′ are within the end batten *b* of the gate. The strips *d d*′ support the gate, and the latter is retained in proper position by the posts C′ D C′ D′.

In order to open the gate, it is first shoved longitudinally, in the direction of arrow 1, until its central batten *b* comes in contact with the post D′, and the gate being then in a balanced state on the strips *d*′ is readily turned around in a position at right angles to the fence B B, as shown in red in Fig. 2.

By this simple arrangement it will be seen that the use of hinges is dispensed with, and still the gate rendered capable of being opened and closed with the greatest facility.

Having thus described my invention, what I claim as new, and desire to secure by Letters Patent, is—

1. The hanging or suspending of a gate in such a manner that it will have a combined sliding and swinging movement in the opening and closing of the same, the gate sliding from a closed position or state to a central balanced state, and then swinging while in a state of equipoise to an open position, and closing from an open position by swinging around in line with the gate-posts, and sliding to a closed state, substantially as shown and described.

2. The placing of the gate-posts C′ D C′ D′ in such a relative position with each other, and constructing and hanging the gate between them, to admit of the opening and closing of the gate, substantially as herein set forth.

A. C. TEEL.

Witnesses:

THOS. M. METCALF,

B. BETHEL.